Sept. 3, 1968  N. A. JAFFE  3,399,473
COMBINATION CREDIT CARD

Filed June 13, 1966  2 Sheets-Sheet 1

INVENTOR.
NISSEN ASHER JAFFE
BY
Jack C. Munro
AGENT

Sept. 3, 1968  N. A. JAFFE  3,399,473
COMBINATION CREDIT CARD
Filed June 13, 1966  2 Sheets-Sheet 2

INVENTOR.
NISSEN ASHER JAFFE
BY
Jack C. Munro
- AGENT -

United States Patent Office 3,399,473
Patented Sept. 3, 1968

3,399,473
COMBINATION CREDIT CARD
Nissen Asher Jaffe, 5336 Anaheim Road,
Long Beach, Calif. 90815
Filed June 13, 1966, Ser. No. 557,166
8 Claims. (Cl. 40—2.2)

ABSTRACT OF THE DISCLOSURE

In combination with a card-like object usable by a consumer to secure credit from a merchant, one or more movable members supported within the card-like object which must be positioned in a particular location to operate a separate testing apparatus.

---

This invention relates to an apparatus to be employed in conjunction with a credit card to prohibit unauthorized use and more particularly to an apparatus contained within the card which requires a combination to be employed correctly before use, thereby denoting the card user as the owner.

Credit cards are commonly known and usually comprised of small portions of sheet material from a place of business denoting thereon a single individual who has earned the privilege of charging goods and services, the payment for such goods and services to be received by said business at a later time. Such credit cards are so commonly used by society that one individual may have six, eight, ten or more cards for which such goods and services can be purchased on credit. However, one problem has arisen from the widespread use of the credit card and that is its unauthorized use. The individual to which the card is issued may lose the card or the card may be stolen or by other means the card can fall into the hands of a person or persons unknown. Such person or persons can, in a short period of time, by forging the individual's name when making purchases, charge a relatively large amount in monetary value.

The main deterrent to such unauthorized use is that it is against the law. However, the amount of money lost in one year from unauthorized use by both the credit card holders and the business issuing the cards is unbelievably high. It has been shown that the fear of the law is not sufficient to prevent forging upon use of credit cards. It would be desirable to provide each card with a device which can be operated only by the individual to whom the card is issued, the correct or incorrect operation of such device to be easily discovered by the merchant making the sale.

The apparatus of this invention is such a device which can only be operated correctly by the individual to which the card is issued. Briefly this invention relates to a credit card which employs a series of dials or longitudinally movable members, having a plurality of separate distinguishable positions. The positions can be denoted numerically as by digits from zero to nine. When the dials or members are properly positioned an electrical circuit (one of several kinds) can be established through the card itself. The completeness of the circuit can be employed to operate a particular detecting device thereby denoting that the card user is the individual to whom the card was issued.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
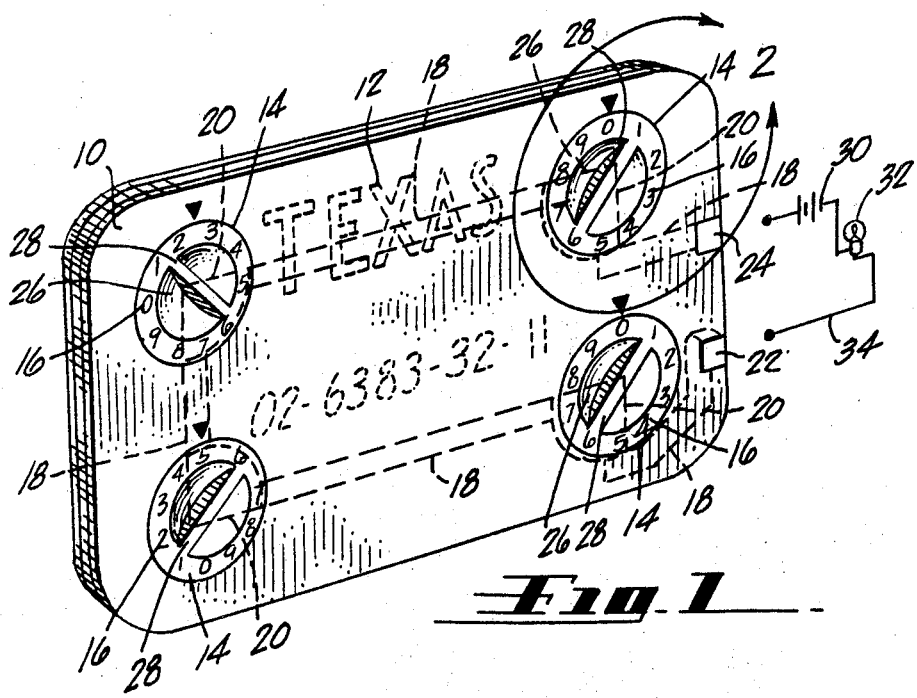
FIGURE 1 is a perspective view of one embodiment of a credit card employing a series of dials.

The first embodiment of the invention is depicted in FIGURE 1. A credit card 10 is shown having legends 12 thereon for denoting the business establishment issuing the particular card. Card 10 includes a plurality of rotatable dials 14 mounted therein, each of the dials having a series of numerical legends 16 thereon. It is to be noted that other means capable of denoting a plurality of separate positions of each dial could be employed, the use of numerals merely being common. Connecting each of the dials 14 is a thin strip of electrically conductive material 18. Material 18 is arranged in a substantially rectangular pattern with each of the dials 14 mounted in the corners of the pattern. The number of dials shown is four; however, any number could be employed and still be within the scope of this invention.

Within each dial 14 is a right angle section of electrically conductive material 20. Any of several commonly available materials could be chosen but it is desirable for the material to not be discernible from the card exterior. A thin layer of copper alloy material has been found suitable for electrically conductive materials 18 and 20. Electrical terminals 22 and 24 are provided on the exterior surface of the card 10 and connected to the terminal ends of the substantially rectangular electrical circuit pattern contained within card 10. Each dial 14 is designed to facilitate use of rotation by human fingers as being hollow shaped 26 with a center upstanding cross member 28.

Figure 2:
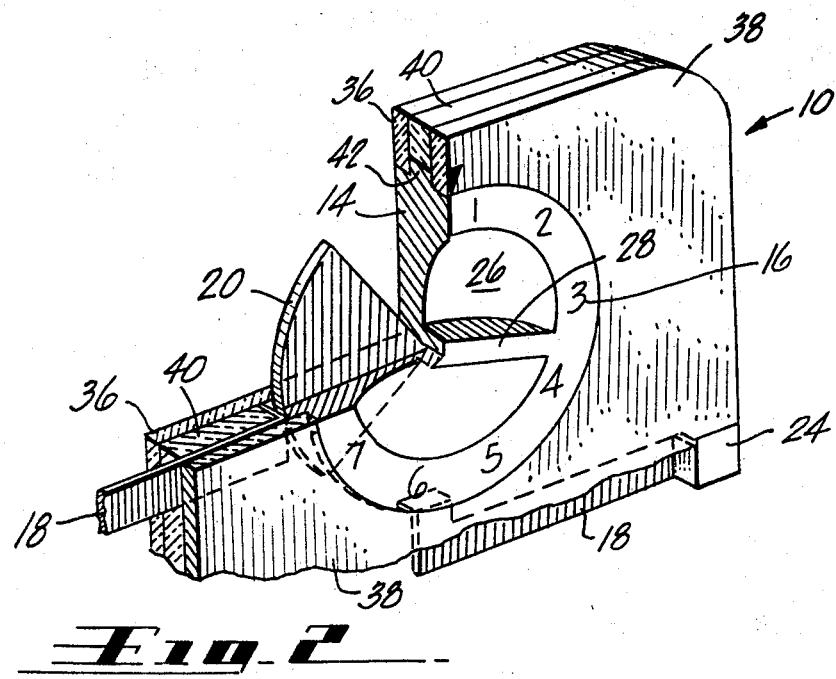
FIGURE 2 is a cut-away view taken along 2—2 of FIGURE 1 showing one of the dials in FIGURE 1 in detail.

The construction of the card 10 is clearly shown in FIGURE 2. Card 10 is sandwiched of three layers of sheet material, exterior members 36 and 38, and inner member 40. Each dial 14 is constructed with an annular boss 42 depending centrally transverse therefrom. Boss 42 is fitted within corresponding opening in inner member 40 and securely held therein by outer members 36 and 38. Each dial 14 is supported within card 10 in a snug interfitting relation, but, also each dial is free to rotate when such a rotational torque is applied thereto.

The operation of the embodiment shown in FIGURE 1 will now be described. The user of the card, before he hands the card to the merchant, sets the dials to the combination which will complete the electrical circuit pattern through the card. The merchant will then apply a testing device to the terminals 22 and 24. One such testing device could be a battery 30, light 32 and connecting conductor 34 which is shown in FIGURE 1. Upon establishing an electrical connection between the ends of the conductor 34 and the terminals 22 and 24, light 32 should flash if the dials 14 are set to the correct combination. Therefore, a closed electrical circuit path is established. Other forms of the testing devices could be used as the testing device shown in FIGURE 1 is merely for purposes of description. The testing device could easily be incorporated within the merchant's card printing apparatus or cash register to facilitate ease of testing.

Figure 3:
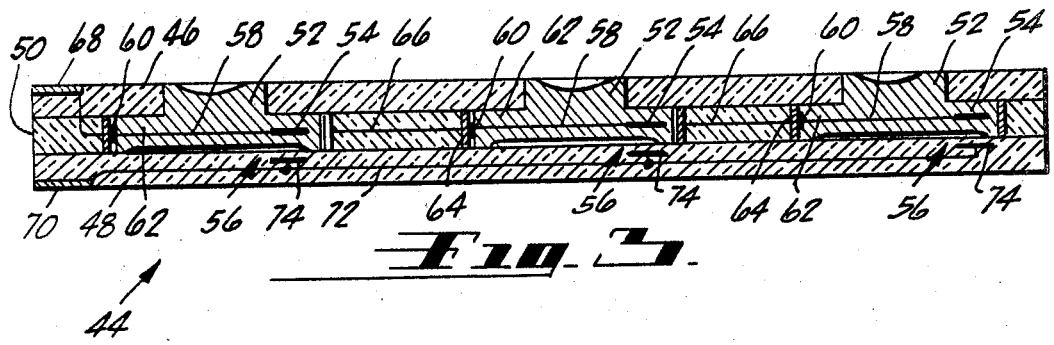
FIGURE 3 is a sectional view through a credit card showing a second embodiment of this invention.

In FIGURE 3 the second embodiment of the invention is shown. Card 44 is shown constructed similar to the embodiment of FIGURES 1 and 2 having exterior members 46 and 48, and inner member 50. A plurality of dials 52 are shown being similar to the dials of FIGURES 1 and 2. Each dial 52 includes a plate 54 of a capacitor 56 positioned interiorly of the dial 52. An electrically conducting wire 58 connects each plate 54 to a contact point 60 which is located in the exterior surface of annular boss 62. A slip ring 64 is annularly disposed within member 50 and adjacent boss 62. The contact point 60 of each dial 52 is to continuously remain in electrical contact with its corresponding slip ring 64 as its dial 52 is rotated. Adjacent slip rings 64 of adjacent dials 52 are electrically connected through wires 66. A terminal 68 is exteriorly mounted on member 46 and connected to the first slip ring 64 of the series of dials 52. A second electrical path is provided within member 48 comprising terminal 70, conductor 72 and capacitor plates 74. Plates 74 are located to align with their corresponding plate 54 at only one position of rotation of dials 52. Such is accomplished by the displacing of the plates 54 and 74 from the center of rotation of each dial 52 as shown in FIGURE 3. It is to be noted that the capacitors 56 are arranged to be electrically parallel, however, it is well known that capacitors in parallel are in effect in series as to their numerical values. Therefore, the resultant capacitance is established by the addition of each of the capacitor's numerical value.

Figure 4:
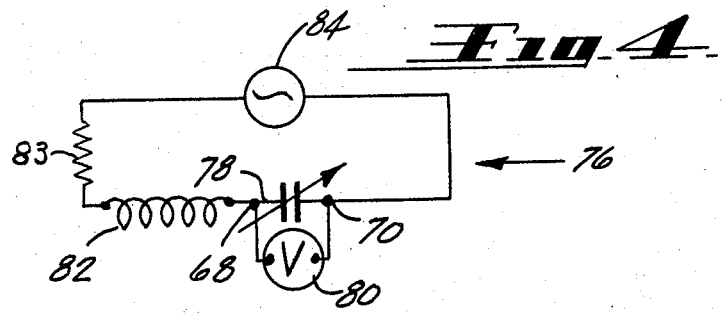
FIGURE 4 is a schematic circuit diagram necessary for the showing of the correct setting of the dials in the embodiment of FIGURE 3.

The embodiment of FIGURE 3 is to be employed with an alternating current testing device instead of the direct current testing device as shown in FIGURE 1. A typical alternating current testing device 76 is shown in FIGURE 4. In FIGURE 4 the resultant capacitance of the card 44 is shown at 78 between terminals 68 and 70, however, other forms of electrical current testing instruments may be employed. The testing circuit also includes an inductance 82, resistance 83 and an alternating current source 84. The basic operating principle of the embodiment of FIGURE 3 is not the same as FIGURE 1 where it is only necessary to complete an electrical circuit. A circuit is completed with only one capacitor 56 being correctly aligned. However, it is well known that given a certain frequency a series resonant circuit can be established for proper values of resistance, inductance and capacitance. Such a resonant circuit is easily noticeable on a voltmeter as the value of the voltage differential across the capacitor is abnormally increased. However, the resonant circuit is to be established only when the plurality of the capacitors 52 are correctly positioned. Therefore, it is obvious that the correct combination by the dials 52 is required before completion of the resonant circuit.

Figure 5:
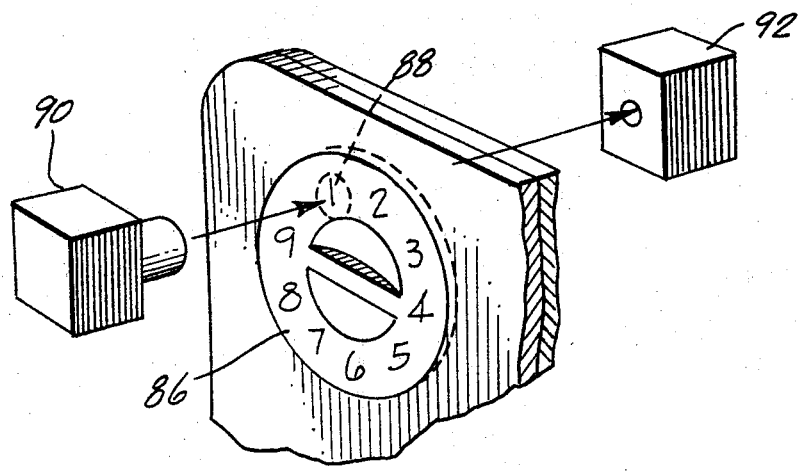
FIGURE 5 is a perspective view depicting a third embodiment of the invention.

The embodiment of FIGURE 5 operates in much the same manner as the previous embodiments but employs a different operating principle. A dial 86 is shown with an area 88 composed of a material which controls the light transmissive characteristics for particular invisible light wave lengths. Area 88 is treated with suitable chemicals to give the dial 86 a uniform degree of transparency or opacity throughout the entire dial surface as far as visible light is concerned. Light source 90 provides the particular invisible light which is required, the wave lengths of such light being predominately in the near infra-red region. A detector 92 is provided which responds only to the attenuated particular light having being transmitted through area 88, the detector 92 then operating a switching apparatus which in turn would operate a suitable device to make known that the dial has been set properly. A card embodying this device would probably have only two such dials, the proper positioning of both dials being necessary to operate detector 92. However, any number of dials could be employed or any convenient signaling means may be used to make known the proper setting of the dials. A good example of the basic principle of such light attenuation is shown and described in U.S. Patent 3,029,345 by David W. Douglas entitled Electronic Key-Card System.

The dial as a means to depict a plurality of separate positions has been described in conjunction with the instant invention. However, other means such as longitudinally slidable members or slats may be employed in conjunction with a credit card as long as a plurality of separate distinguishable positions are positionable.

From the foregoing it is felt that the subject invention is adequately described. It is to be remembered that the basic operating principles in themselves are not felt to be novel, but, their application in combination with a credit card renders a unique apparatus capable of preventing unauthorized use of a credit card. The number of dials to be employed functions only to vary the number of possible combinations and in itself is not to be restrictive.

While the particular embodiments of the present invention have been shown and described, it will be obvious to those skilled in the art that changes and modifications may be made without departing from this invention in its broader aspects and, therefore, the aim in the appended claims is to cover all such changes and modifications which fall within the true spirit and scope of this invention.

I claim:

1. In combination with a card-like object which is usable by a consumer for obtaining credit from a merchant, an apparatus contained within said card-like object for preventing unauthorized use thereof comprising:
   an electrical circuit contained within said card-like object;
   at least one movable member associated with said card-like object and being arrestable in a plurality of positions, said movable member being capable of opening said electrical circuit, said movable member being capable of closing said electrical circuit in at least one of said positions.

2. An assembly as defined in claim 1 wherein:
   said movable member comprises a dial.

3. An assembly as defined in claim 2 wherein:
   a plurality of said dials are employed, said dials being securely attached to said card-like object; and allowing only rotational movement with respect thereto.

4. An assembly as defined in claim 1 wherein:
   said electrical circuit being capable of transmitting an alternating current, said movable member including therein structure to vary the capacitance of said circuit.

5. An assembly as defined in claim 1 wherein:
   said electrical circuit being capable of transmitting a direct current, said movable member including structure therein to form a continuous strip of electrically conductive material forming said electrical circuit.

6. In combination with a card-like object which is usable by a consumer for obtaining credit from a merchant, an apparatus contained within said card-like object for preventing unauthorized use thereof comprising:
   at least one movable member associated with said card-like object and being arrestable in a plurality of positions, a segment of said movable member being capable of transmitting near infrared wave length light, whereby at a specific location of said movable member with respect to said card-like object infrared light from a separate source is transmitted through said movable member denoting a particular positioning of said movable member.

7. An assembly as defined in claim 6 wherein:
   said movable member comprises a dial.

8. An assembly as defined in claim 7 wherein:
   a plurality of said dials are employed, said dials being securely attached to said card-like object allowing only rotational movement with respect thereto.

References Cited

UNITED STATES PATENTS

| | | | |
|---|---|---|---|
| 746,577 | 12/1903 | Rivenburgh | 200—43 X |
| 2,734,954 | 2/1956 | Kidd | 200—43 X |
| 3,245,697 | 4/1966 | Nugent | 283—7 |

EUGENE R. CAPOZIO, *Primary Examiner.*

W. J. CONTRERAS, *Assistant Examiner.*